United States Patent [19]

Togawa et al.

[11] Patent Number: 4,953,225
[45] Date of Patent: Aug. 28, 1990

[54] HANDWRITTEN CHARACTER-RECOGNIZING APPARATUS FOR AUTOMATICALLY GENERATING AND DISPLAYING CHARACTER FRAMES

[75] Inventors: Fumio Togawa, Nara; Hitoshi Hirose, Higashiosaka, both of Japan

[73] Assignee: Sharp Kabushiki Kaisha, Osaka, Japan

[21] Appl. No.: 257,842

[22] Filed: Oct. 14, 1988

[30] Foreign Application Priority Data

Oct. 16, 1987 [JP] Japan ................................ 62-262538
Nov. 25, 1987 [JP] Japan ................................ 62-296876

[51] Int. Cl.$^5$ .............................................. G06K 9/00
[52] U.S. Cl. ......................................... 382/13; 382/3; 382/59
[58] Field of Search ................... 382/13, 3, 59, 10, 1, 382/58

[56] References Cited

U.S. PATENT DOCUMENTS 4,184,147 1/1980 Seelbach .............................. 382/13
4,641,354 2/1987 Fukunaga et al. .................... 382/13
4,672,677 6/1987 Yamakawa ........................... 382/13
4,680,804 7/1987 Kuzunuki et al. .................... 382/13

Primary Examiner—Leo H. Boudreau
Assistant Examiner—Michael Razavi

[57] ABSTRACT

A handwritten character-recognizing apparatus having a discriminating device which discriminates whether or not an input device, namely, the pen of a writing/displaying tablet has moved from one character frame to the following character frame. When it is discriminated that the input device has moved to the following character frame, a character frame generating device automatically generates a character frame adjacent to the last character frame of the character frames arranged in a line. Thereby, the reading of handwritten characters and the recognizing of standard characters which are displayed instead of the handwritten characters are facilitated.

11 Claims, 8 Drawing Sheets

< input/automatic correction >

銀河系の大宇宙からやってきた
(gingakei no daiuchu kara yattekita)

(came from the galactic system in the universe)

21 — か
(k)

22 — かい — 23
(ka)

かいじ
(kai)

かいじゅ
(kaij)

かいじゅう
(kaiju)

かいじゅうが
(kaijug)

かいじゅうが    x—24 (indication with pen)
(kaijug)

銀河系の大宇宙からやってきた 怪獣が
(gingakei no daiuchu kara yattekita kaiju ga)

(a monster coming from the galactic system in the universe)

Fig. 6(b)

怪獣が
(kaiju ga)
(monster)

Fig. 6(a)

| conversion | next candidate |
|---|---|
| previous candidate | backspace |
| non-conversion | space |
| cancellation | line feed |
| japanese alphabet/katakana/alphanumeric | |

Fig. 6(c)

怪獣がい
(kaiju ga i)
(monster is)

Fig. 7(a)

銀河系の大宇宙からやってきた | 行った。
(gingakei no daiuchu kara yattekita) (itsutta)
(coming from the galactic system in the universe) (has disappeared)

銀河系の大宇宙からやってきた 行った。
(gingakei no daiuchu kara yattekita) (itsutta)
(coming from the galactic system in the universe) (has disappeared)

銀河系の大宇宙からやってきた かいじゅうが 行った。
(gingakei no daiuchu kara yattekita) (kaiju) (itsutta)
(a monster coming from the galactic system in the universe) (has disappeared)

⟨ modification (display by selection from next candidate) ⟩

銀河系の大宇宙からやってきた かいじゅう (kaiju)
(gingakei no daiuchu kara yattekita)
(came from the galactic system in the universe)

銀河系の大宇宙からやってきた かいじゅう (kaiju)
(gingakei no daiuchu kara yattekita)
(came from the galactic system in the universe)

銀河系の大宇宙からやってきた かいじゅう が (kaiju g) ×—indication with pen
(gingakei no daiuchu kara yattekita)(kaiju g)
(came from the galactic system in the universe)

銀河系の大宇宙からやってきた怪獣が
(gingakei no daiuchu kara yattekita kaiju ga)
(a monster coming from the galactic system in the universe)

Fig. 10

<movement of character frame>   <indication with pen>

天の川を眺めていると私は幻想の世界に入った。ギリ
シャ神話に登場する神々が現れた。銀河系の大宇宙か
らやってきた怪獣が行った。☐☐☐

( Amanokawa o nagameteiruto watashiwa gensono sekai ni haitta.
  Girisha shinwa ni tojosuru kamigami ga arawareta. Gingakei no
  daiuchu kara yattekita kaiju ga itta. )

(Gazing at the Milky Way, I became lost in reverie.
  Gods of the Greek mythology appeared. A monster coming
  from the galactic system in the universe has disappeared.)

天の川を眺めていると☐☐☐私は幻想の世界に入った。
ギリシャ神話に登場する神々が現れた。銀河系の大宇
宙からやってきた怪獣が行った。

( Amanokawa o nagameteiruto watashiwa gensono sekai haitta.
  Girisha shinwa ni tojosuru kamigami ga arawareta. Gingakei
  no daiuchu kara yattekita kaiju ga itta. )

(Gazing at the Milky Way, I became lost in reverie.
  Gods of the Greek mythology appeared. A monster coming
  from the galactic system in the universe has disappeared.)

天の川を眺めていると|い|つ|の|☐|私は幻想の世界に入．
                    itsuno
った。ギリシャ神話に登場する神々が現れた。銀河系
の大宇宙からやってきた怪獣が行った。

( Amanokawa o nagameteiruto watashiwa gensono sekai haitta.
  Girisha shinwa ni tojosuru kamigami ga arawareta. Gingakei
  no daiuchu kara yattekita kaiju ga itta. )

(Gazing at the Milky Way, I became lost in reverie.
  Gods of the Greek mythology appeared. A monster coming
  from the galactic system in the universe has disappeared.)

Fig. 11

かいじゅうが
(kaiju ga)   x — indication with pen
(monster is)

怪獣が
(kaiju ga)
(monster is)

| conversion | next candidate |
| --- | --- |
| previous candidate | backspace |
| non-conversion | space |
| cancellation | line feed |
| | japanese alphabet/katakana/alphanumeric |

怪獣がい
(kaiju ga i)
(a monster is)

HANDWRITTEN CHARACTER-RECOGNIZING APPARATUS FOR AUTOMATICALLY GENERATING AND DISPLAYING CHARACTER FRAMES

BACKGROUND OF THE INVENTION

1. Field of the Invention

The present invention relates to a handwritten character-recognizing apparatus in which the information of a handwritten character inputted to a writing/displaying tablet is recognized as a character by a recognizing unit under the control of the central processing unit thereof and the result thus recognized is outputted to the writing/displaying tablet so that the recognized result is displayed thereon.

The present invention also relates to a handwritten character-recognizing apparatus in which a writing/displaying tablet for displaying a plurality of frames on which characters are handwritten is provided. The information of characters are written with a pen in the frames for writing characters to be recognized, and frames for writing characters to display the recognized characters on the writing/displaying tablet are automatically generated.

2. Description of Related Art

A word processor to which the information of a handwritten character is inputted to a tablet is known as a handwritten character-recognizing apparatus. This word processor is provided with a writing/displaying tablet including a tablet which has a pen serving as an input device for indicating a coordinate and an EL (electroluminescence) display which is superimposed on the tablet to display characters inputted to the tablet. In this word processor, a character written with a pen in the character input portion of the writing/displaying tablet is recognized as a standard character pattern by a recognizing unit under the control of the central processing unit thereof and the result thus recognized is edited, i.e., operations such as a modification, deletion, insertion, and the conversion of "kana" (Japanese alphabet) into "Chinese character" is performed. Thereafter, the result thus obtained is displayed on the display portion of the writing/displaying tablet instead of the character written with the pen. The information of handwritten characters are inputted to the input portion of the writing/displaying tablet by sequentially writing characters in lattice-shaped frames for writing characters (hereinafter referred to as character frame) provided entirely on the display portion of the writing/displaying tablet.

However, as described above, the character frames are displayed entirely on the display screen of the abovedescribed word processor. Thus, it is hard for an operator to read clearly both characters written with the pen and the recognized standard characters. No provision of the character frames facilitates the operator in reading the characters clearly. In contrast, the provisions of the character frames make it more difficult for the operator to write characters, because the sizes of the characters vary and it is difficult to line up the characters. Thus, it is impossible for the character recognizing unit of the word processor to perform its function.

In order to overcome the above-described disadvantage, the following method can be considered: Every time an operator writes a character in one of several character frames displayed in a row on a writing/displaying tablet, a character frame is generated in the position adjacent to the last character frame of a line of the character frames.

However, the operator is required to operate keys of the keyboard even if the word processor has the abovedescribed function. Further, when it is necessary for the operator to change the position in which a character is written, the operator is required to operate keys of the key board, which is troublesome.

SUMMARY OF THE INVENTION

The present invention has been made with a view to substantially solve the above-described disadvantages.

It is an object of the present invention to provide a handwritten character-recognizing apparatus in which every time an operator writes a character in one of several frames for writing characters (hereinafter referred to as character frames) displayed in a row on a writing/displaying tablet, a character frame is generated in the position adjacent to the last character frame of a line of the character frames so that the operator may easily read written characters and standard character patterns and a character can be written in a desired position of a tablet for facilitating character recognition. Thereby, editing processing, which was previously performed by a complicated operation of keys of a keyboard provided with a known word processor, can be performed at a higher speed by the generation of character frames as described above with a character-input device such as a pen.

It is another object of the present invention to provide a handwritten character-recognizing apparatus in which an editing operation, such as the conversion of "kana" (Japanese alphabet) into a "Chinese character," can be made by the use of a pen and an automatic generation of a character frame in any desired position of the display portion thereof without operating keys of a keyboard.

A handwritten character-recognizing apparatus, in accordance with the present invention, has character information inputted to a frame for handwriting a character displayed on a writing/displaying tablet by handwriting from an input device which is recognized as a character by a character recognizing unit under the control of a central processing unit. The result thus recognized is outputted to the writing/displaying tablet which includes a discriminating device for discriminating whether or not the input device has moved from a character frame to the following character frame; and a character frame generating device for automatically generating and displaying a character frame in a position adjacent to the last character frame of a line of character frames when the discriminating device discriminates that the input device has moved from the character frame to the following character frame.

According to the handwritten character-recognizing apparatus, when an operator handwrites characters sequentially in character frames displayed on the writing/displaying tablet with the input device the discriminating device discriminates whether or not the input device has moved from a character frame to the following character frame in response to a signal supplied from the writing/displaying tablet. When the discriminating device discriminates that the input device has moved to the following character frame, a signal is transmitted to the character frame generating device. In response to the signal, the character frame generating device generates character frames in a position adjacent to the last character frame of a line of the character frames. Thus, every time an operator writes a character in a character frame, a character frame is sequentially generated and displayed on the display portion thereof. Accordingly, the operator can read handwritten characters and character patterns corresponding thereto. Further, the operator can write a character in a desired position without performing difficult operations.

A handwritten character-recognizing apparatus, in accordance with the present invention, are automatically generates character frames in any desired position includes a pen for inputting a handwritten character to a tablet, a writing/displaying tablet for displaying a plurality of character frames in which characters are handwritten with the pen and the standard characters corresponding to characters handwritten in the character frames are displayed sequentially and a character recognizing device for recognizing the information of the handwritten characters and displaying the standard characters corresponding to the recognized character on the writing/displaying tablet. The writing/displaying tablet includes a detecting device for detecting the position of the display screen of the writing/displaying tablet indicated with the pen, a discriminating device for discriminating whether or not the position indicated with the pen is located in any of the character frames, a character editing device for the editing of the character patterns displayed in a line of the character frames if the position indicated with the pen is determined to be outside the character frames and the character patterns are displayed in the character frames, and a character frame moving device for moving the character frames to the position indicated with the pen if the position indicated with the pen is determined to be outside the character frames and the character patterns are not displayed in the character frames.

According to the handwritten character recognizing apparatus in which character frames are automatically generated, when the pen is outside the character frames and characters patterns are displayed in the character frames, character editing is effected. When the pen is outside the character frames and no characters are displayed in the character frames, the character frames are moved to the position indicated by the pen. Accordingly, it is unnecessary to provide the handwritten character-recognizing apparatus with a keyboard and only the movement of the pen enables the editing of the characters and the movement of the character frame. Further, the characters can be written in any desired position for a modification.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 8 through 11 show a second embodiment of the present invention;

DETAILED DESCRIPTION OF THE INVENTION

(FIRST EMBODIMENT)

A detailed description for the embodiment of the present invention are made with reference to the accompanying drawings.

The first embodiment is described with reference to FIGS. 1 through 7.

Figure 1:
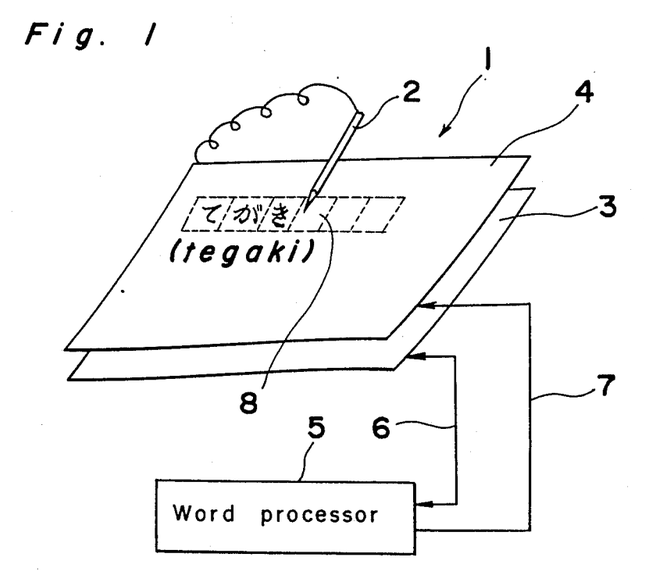
FIG. 1 is a schematic diagram of a handwritten character-recognizing apparatus in accordance with a first embodiment of the present invention.

Referring to FIG. 1, which is a schematic block diagram, shows a handwritten character-recognizing apparatus (hereinafter referred to as a word processor) having a writing/displaying tablet. The tablet, the display writing/displaying tablet 1 includes a tablet 3 functioning as an input unit having a pen 2 serving as a coordinate input device and an electroluminescence display 4 hereinafter referred to as EL) serving as a display portion and being superimposed on the tablet 3. The tablet 3 is connected to the word processor 5 by an input signal transmitting line 6. The EL 4 is connected to the word processor 5 by a display output signal transmitting line 7.

Figure 2:
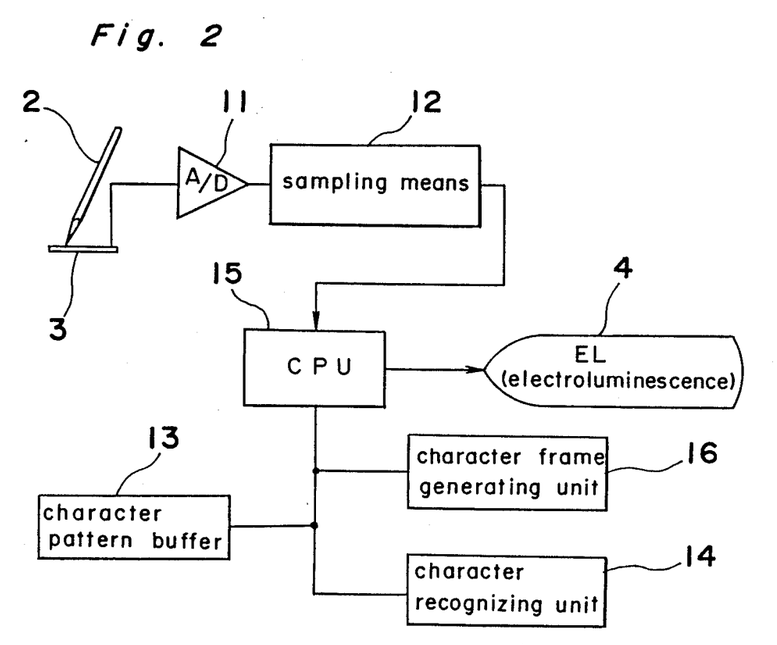
FIG. 2 is a block diagram of the handwritten character-recognizing apparatus.

The block diagram of the word processor 5 shown in FIG. 2 includes an A/D converter which converts an analog signal, indicating the coordinate given by the pen 2 and being inputted from the tablet 3, into a digital signal, a sampling device 12 which samples the digital signal applied thereto from the A/D converter frame in response to a signal inputted thereto from the tablet 3. a character pattern buffer for storing sampled data of a frame 8 and writing a character (a frame for writing a character is hereinafter referred to as a character frame) in a character frame which the pen 2 is currently writing a character as shown in FIG. 1; a character recognizing unit 14 which recognizes a character from a comparison between the sampled data stored in the character pattern buffer 13 and the standard character pattern stored in the character recognizing unit 14. The word processor 5 further includes a CPU 15 and a character frame generator 16. The CPU 15 controls the respective units of the word processor 5, performs editing operations such as modifying, deleting, inserting the result recognized by the character recognizing unit 14 and converting a "kana" (Japanese alphabet) into a Chinese character in response to an editing instruction signal transmitted from the tablet 3, and stores the recognized and edited results in the memory thereof The character frame generator 16 generates character frame patterns for displaying a plurality of character frames on the EL 4 and also serves as a character frame generating device, the details of which is described later.

The CPU 15 includes a discriminating device which discriminates whether or not the point of the pen 2 has moved from one character frame to the following character frame in response to a signal inputted thereto from the tablet 3 frame. When the discriminating device discriminates that the pen 2 has moved to the following character frame, the CPU 15 outputs a signal indicative of the generation of a character frame to the character frame generator 16. In response to the signal indicative of the generation of the character frame, the character frame generating device of the character frame generator 16 generates a character frame adjacent to the last character frame of a line of the character frames which has been displayed.

The operation of the word processor 5 is described with reference to FIG. 3.

At step 1, before character information is inputted to the tablet 3, the character frame generator 16 generates, under the control of the CPU 15, (n) pieces of character frames on the EL 4 at a predetermined position thereof adjacent to the last character frame of the character frames arranged in a row to which character information has been already inputted. At step 2, the CPU 15 resets the numerical value (i) of a counter, which counts a character frame number to which a character is being inputted, to one. At step S3, the coordinate data of the point is inputted by the pen 2 to (i)-th character frame of the tablet 3. Namely character information inputted by the pen 2 is stored in the character pattern buffer 13 through the A/D converter 11 and the sampling device 12, and the data of the detected coordinate is outputted to the EL 4 for carrying out a parallel display, i.e., the inputted coordinates of the point of the pen 2 is stored and the information for the locus of the point of the pen 2 is simultaneously displayed and outputted. At step S4, it is detected whether or not the point of the pen 2 is located in the current character frame, namely, in the (i)-th character frame. If the pen 2 is located in the current character frame the operation to be performed at step S3 continues, i.e., the coordinates of the point of the pen 2 continue to be read. If the pen 2 is not located in the current frame the program goes to step S5.

At step S5, the character recognizing unit 14 recognizes the character information which has been inputted to the (i)-th character frame. At step S6, the result recognized by the recognizing unit 14 is displayed on the EL 4 instead of the handwritten character. At step S7, it is detected whether or not the point of the pen 2 is located in the following character frame, namely, in the (i+1)-th character frame. If the pen is located in the (i+1)-th character frame, the program goes to step S8 and the numerical value (i) of the counter is incremented. At step S9, a signal indicative of the generation of a character frame is outputted to the character frame generator 16. In response to the signal, a character frame is generated in the position adjacent to the last character frame of a line of the character frames. Thereafter, the program returns to step S3 and a character is written with the pen 2 in the (i+1)-th character frame for progressing in the same manner as described above. If it is detected at step S7 that the point of the pen 2 is outside the (i+1)-th character frame, the CPU 15 decides that the character information will no longer be inputted.

Figure 4:
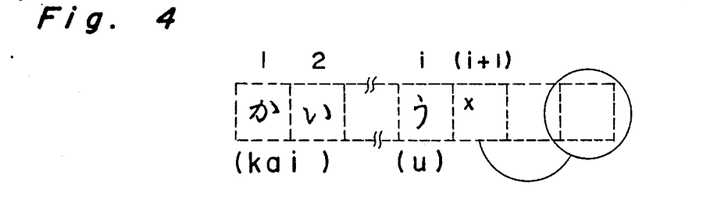
FIGS. 4 through 7 are explanatory views in which the processing performed by the handwritten character-recognizing apparatus are illustrated by the change of the display portion thereof.

FIG. 4 shows the change of the display of the character frame of the EL 4 which occurs by the operations performed at steps S7 through S9. When the character (u) has been written and the point of the pen 2 moves to the point (x) in the (i+1)-th character frame, one character frame shown by an arrow is displayed in the position adjacent to the last character frame of a line of the character frames which has have been already displayed.

Figure 5:
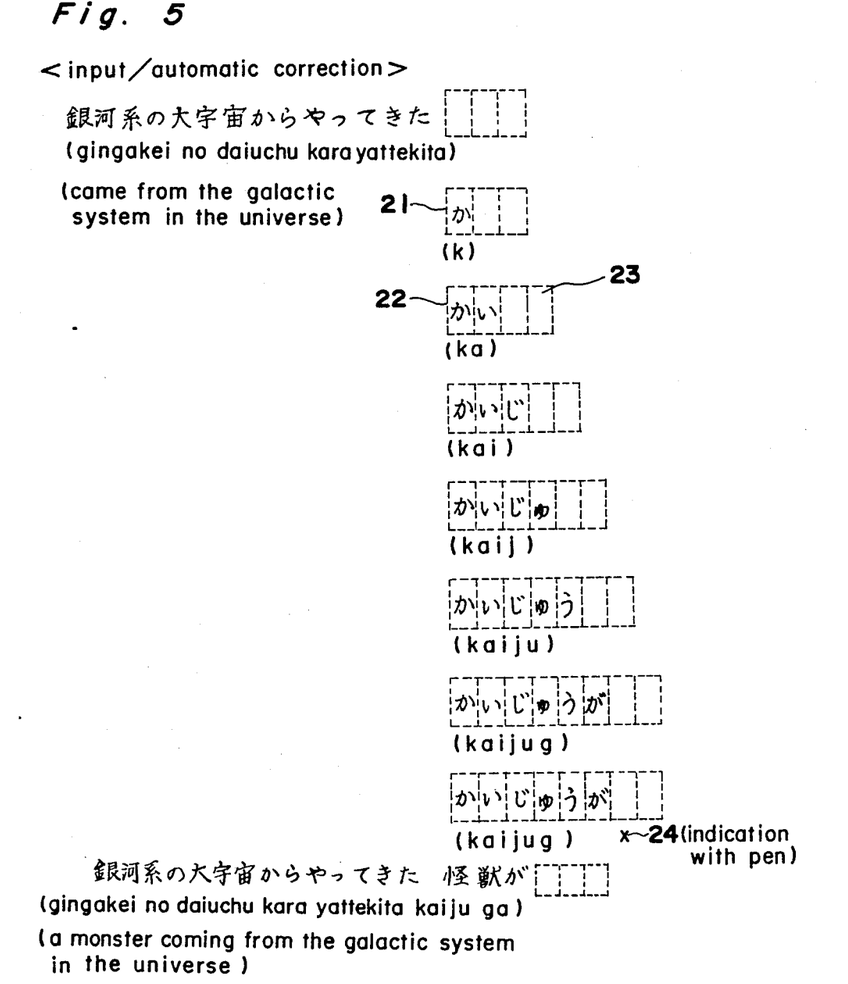

FIG. 5 shows an example of the changes in the display of the character frame of the EL 4 which takes place by the above-described sequential processing operations. First, three character frames are displayed on the EL 4 adjacent to the last character frame of a line of the character frames composing a sentence displayed thereon (step S1). The operator writes characters in these character frames from the left toward the right with the pen 2. During this operation, the character 21 which the operator has written in a character frame is replaced with a recognized character (step S6) every time the operator moves the pen 2 to an adjacent character frame. At the same time, a character frame 23 is generated adjacent to the last character frame of a line of the character frames (step S9). When the pen 2 is moved outside the seventh character frame as shown by the mark (x) denoted by reference numeral 24, the CPU 15 decides that the input of a Japanese word "kaiju" (English equivalent is "monster") to the tablet 3 has been completed.

Figure 6A:
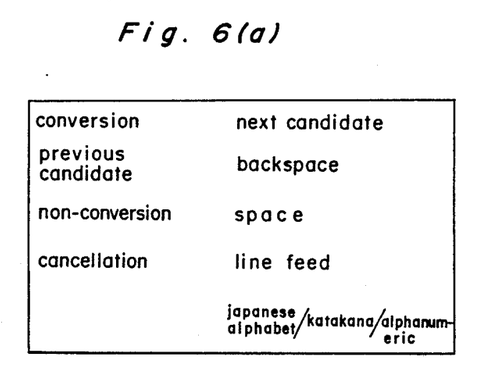
Figure 6B:
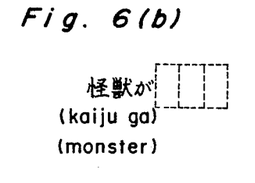
Figure 6C:
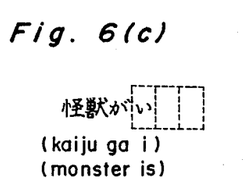

The editing operation to be performed by the CPU 15 in response to an instruction signal applied thereto from the tablet 3 is described hereinbelow with reference to FIG. 6 which shows a menu window to be displayed on the EL 4. When the operator places the pen 2 outside the character frames as shown by the mark (x) or when the operator presses a menu key (not shown) mounted on the tablet 3 with the pen 2 upon completion of writing characters in the character frames, a modifying menu window as shown by FIG. 6-(a) is displayed in the vicinity of the character frames. The operator can modify the characters displayed on the EL 4 by selecting a desired item from the modifying menu shown on the display of the EL 4. For example, if the operator wants to convert "kaiju" (English equivalent is "monster") which is "kana" (Japanese alphabet) into Chinese characters, the operator selects "conversion" from the items of the modifying menu window. By this operation, "kaiju" displayed in "kana" (Japanese alphabet) is converted into Chinese characters and is displayed on the EL 4 as shown by FIG. 6-(b). If the operator begins to write a character in the following character frame as shown in FIG. 6-(c), the modification mode is switched to the input mode.

Figures 7A, 7B:
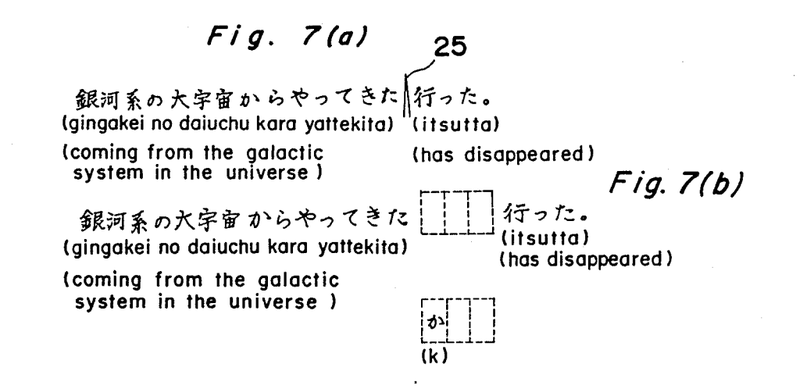
Figure 7C:
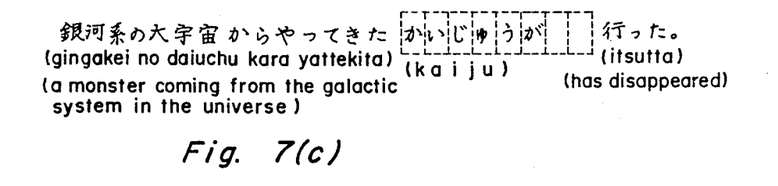

FIG. 7 illustrates another example of the editing operations which are performed by the CPU 15. When the operator marks the insertion mark "25" with the pen 2 in a position into which the operator desires to insert some characters as shown in FIG. 7-(a), three character frames are displayed from the position the operator has marked toward the right as shown in FIG. 7-(b). Thus, an operation similar to that described above is performed as shown in FIG. 7-(c).

As described above, in the first embodiment, the writing/displaying tablet 1 has a function of displaying the menu key for displaying the modifying menu and the CPU 15 edits the result recognized by the character recognizing unit 14 in response to the instruction signal applied thereto from the menu key, which eliminates the need to operate difficult key provisions of a keyboard i.e., an editing operation can be performed at a very high speed because an instruction can be given directly to the CPU 15 by the pen on the display of the writing/displaying tablet 1. Thus, the operability of the word processor is greatly improved. Further, in the first embodiment, every time an operator writes a character in a character frame, a character frame is automatically generated in the position adjacent to the last character frame of a line consisting of a small number of character frames. Accordingly, handwritten characters and recognized standard characters are much easier to read than characters displayed on the display portion of a known word processor, and characters can be written in any desired position of the display portion for modifying displayed characters.

In the first embodiment, three character frames are displayed in a predetermined position of the EL 4, but needless to say, any number of character frames greater than one can be displayed. Further, instead of writing characters laterally, characters can be written vertically. Also, and the dimension and the shape of the character frames, and the direction of a line of character frames can be changed as desired. In the first embodiment, an electroluminescence display is used as the display portion of the writing/displaying tablet 3, however, a liquid crystal display or a CRT may be used.

As apparent from the foregoing description, in the character recognizing apparatus in accordance with the present invention, the discriminating device discriminates whether or not the input device, namely, the pen of the writing/displaying tablet has moved from a character frame to the following character frame. When the input device is determined to have moved to the following character frame, the character frame generating device automatically generates a character frame adjacent to the last character frame of the character frames arranged in a line. Accordingly, in comparison to a known character recognizing apparatus in which character frames are latticed entirely on the tablet thereof, the word processor in accordance with the present invention facilitates the reading of handwritten characters and recognized standard characters which are displayed instead of the handwritten characters. In addition, characters can be written in appropriate positions of the tablet, so that the character recognizing unit may easily recognize the handwritten characters.

(SECOND EMBODIMENT)

Figure 3:
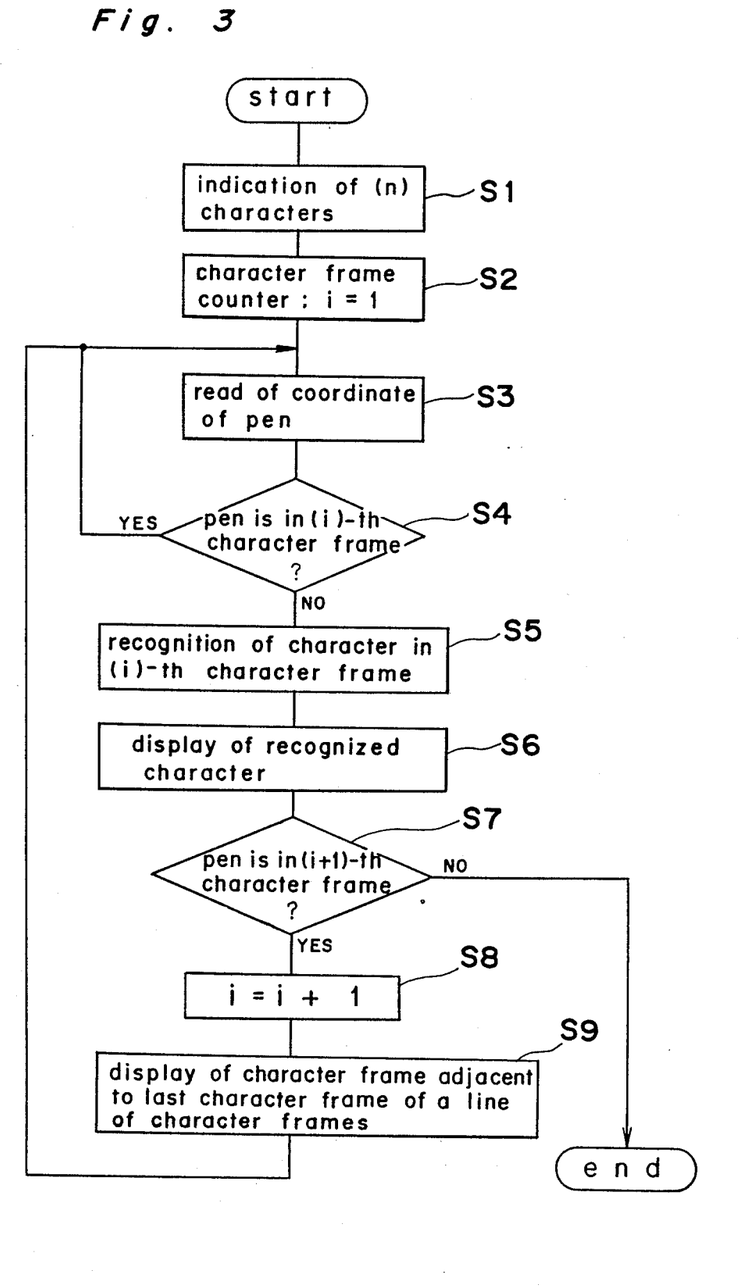
FIG. 3 is a flowchart showing the processing of the handwritten character-recognizing apparatus.
Figure 8:
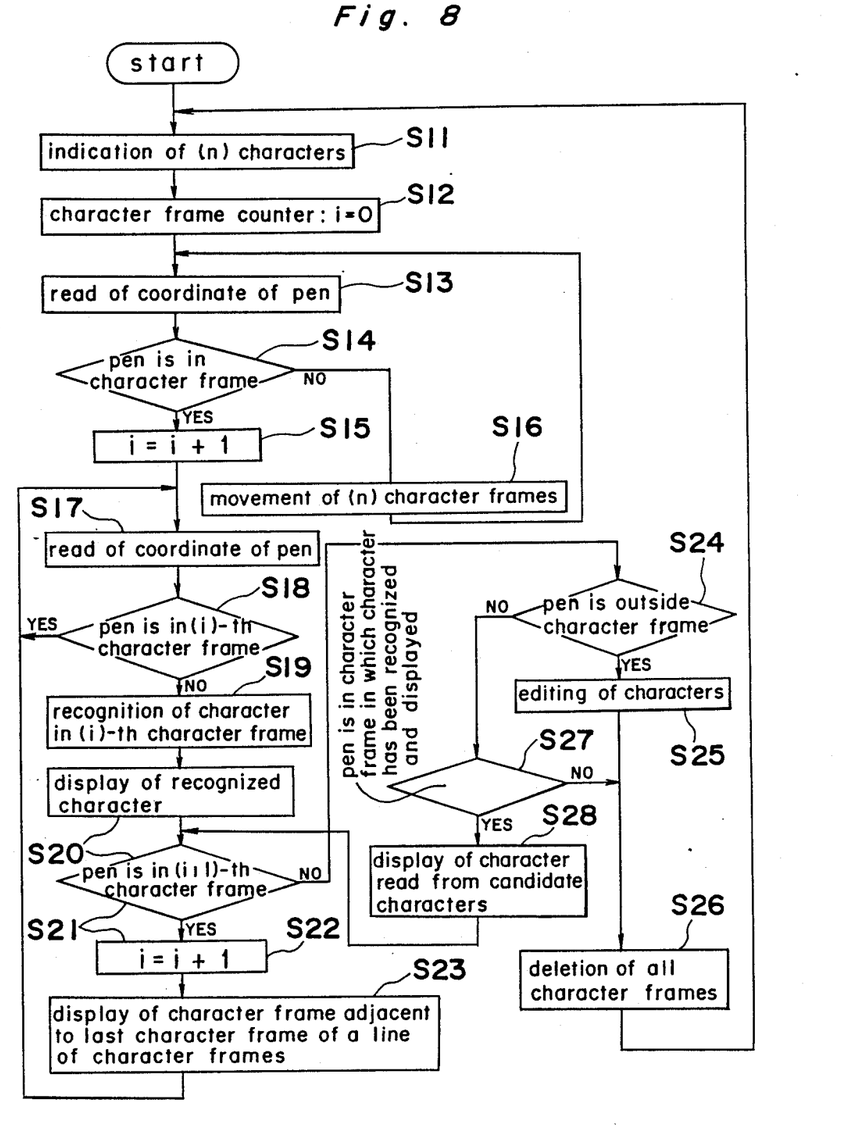
FIG. 8 is a flowchart for describing the operation of the handwritten character-recognizing apparatus in which a writing/displaying tablet is used.
Figure 10:
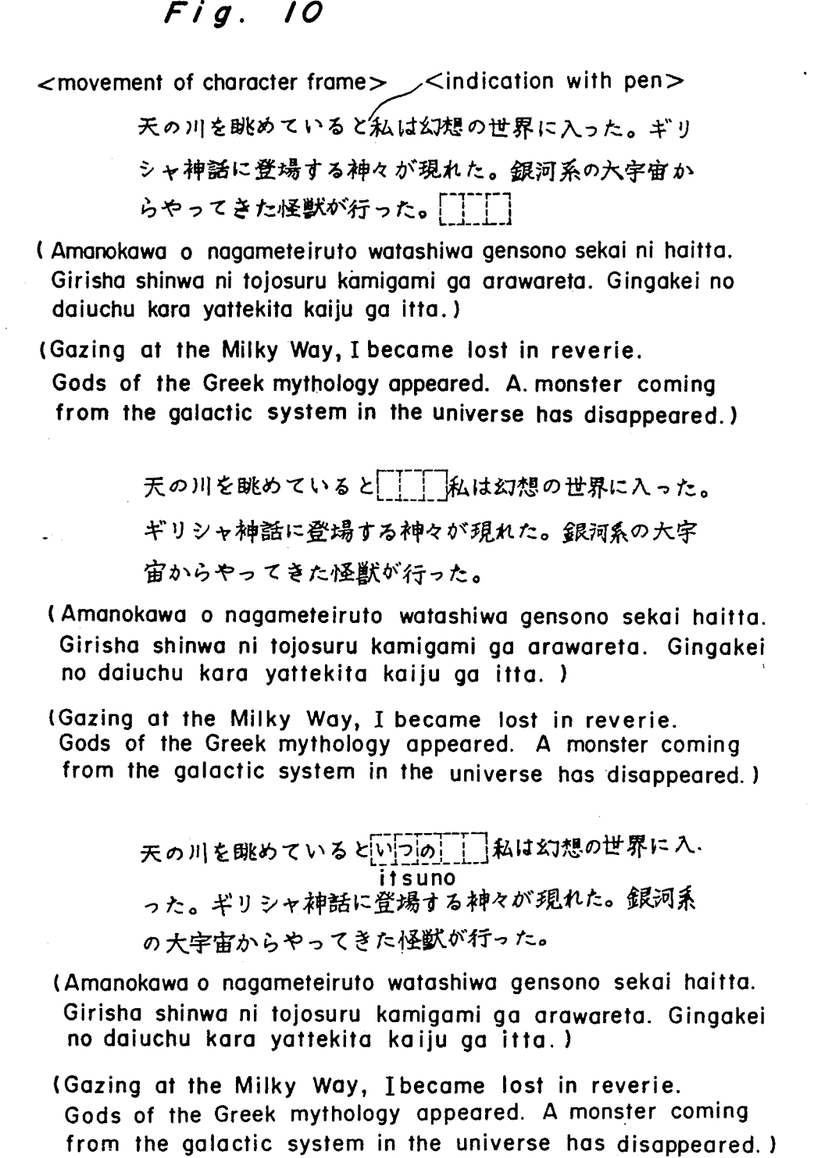
Figure 11:
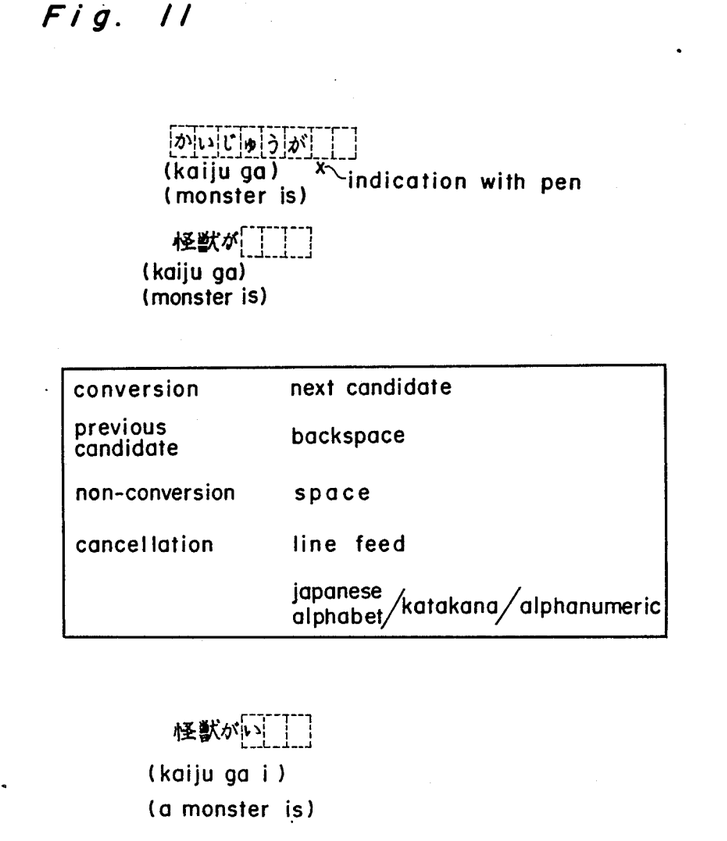

FIG. 8, which is a modification of the flowchart shown in FIG. 3, is a flowchart for describing the operation of the second embodiment in accordance with the present invention. FIGS. 5, 10, and 11 illustrate the operation of the second embodiment in accordance with the present invention.

The operation of the second embodiment in accordance with the present invention is described with reference to FIGS. 2, 5 and 8 through 11. At step S11, the CPU 15 issues an instruction to a character frame generator 16 to display (n) pieces of character frames in a predetermined position of a display portion 4, namely, in a position adjacent to the last character frame of character frames composing a sentence or the like already displayed. Although two character frames or more are displayed on the display portion 4, three character frames are displayed on the display portion 4 in the second embodiment. At step S12, the CPU 15 sets the numerical value (i), of a counter, which counts a character frame number, to 0.

The information of the coordinate of a desired position indicated by the pen in the display portion 4 is converted into a digital signal by an A/D converter 11. The digital signal indicating the information of the coordinate is sampled by a sampling device 12 at a constant interval. The sampled data is inputted to the CPU 15. At step S13, the CPU 15 reads the digital signal indicative of the coordinate of the pen 2 supplied from the sampling device 12.

At step S14, according to the digital signal which indicates the coordinate of the point of the pen 2 and is read by the CPU 15, the CPU 15 detects whether or not the point of the pen 2 is located in the first frame of the three character frames initially displayed. If the point of the pen 2 is located in the first frame, the CPU 15 increments the numerical value (i) of the counter by one at step S15. At step S17, simultaneous with the CPU 15 issuing an instruction to a character pattern buffer 13 for storing the data of coordinates of the point of the pen 2 inputted to the (i)-th character frame, the CPU 15 displays the data of the coordinates and the locus of the point of the pen 2 on the display portion 4. At step S18, the CPU 15 decides whether or not the point of the pen 2 is located in the current character frame, namely, the (i)-th character frame.

Referring to FIG. 5, if the point of the pen 2 is located in the (i)-th character frame, simultaneous with the character pattern buffer 13 storing the data of the coordinates of the point of the pen 2 given to the (i)-th character frame, the CPU 15 displays the coordinates on the display portion 4. If the CPU 15 detects at step S18 that the point of the pen 2 is outside the (i)-th character frame, the CPU 15 issues an instruction at step S20 to a character recognizing unit 14 for recognizing the handwritten character which has been written in the (i)-th character frame. At step S20, the recognized result is displayed, instead of the handwritten character, on the display portion 4. At step S21, the CPU 15 decides whether or not the point of the pen 2 has moved to the following character frame, namely, (i+1)-th character frame. If the point of the pen 2 has moved to the following character frame, the numerical value (i) of the counter is incremented by one at step S22. At step S23, a character frame is generated in the position adjacent to the last character frame of a line of the character frames.

Referring to FIG. 5, if the CPU 15 detects that the point of the pen 2 is located outside the (i+1)-th character frame, it is determined whether or not the point of the pen 2 is located outside the (i)-th through (i+n-1)-th character frames. If at step S24 the point of the pen 2 is outside the (i)-the through (i+n+1)-th character frames, character editing processing are performed. For example, all the character information inputted to the character frames arranged in a row is automatically modified or a plurality of "kana" (Japanese alphabet) are converted into Chinese characters. In this case, needless to say, no "kana" (Japanese alphabet) is converted into a Chinese character when handwritten characters are Chinese characters. At step S26, the CPU 15 deletes all of the (i+n−1) pieces of characters which have been displayed. Thereafter, the program returns to step Sll (the initial routine) and (n) pieces of character frames are generated in the position adjacent to the last character frame of a line of the character frames to which the character information has been inputted.

Figure 9:
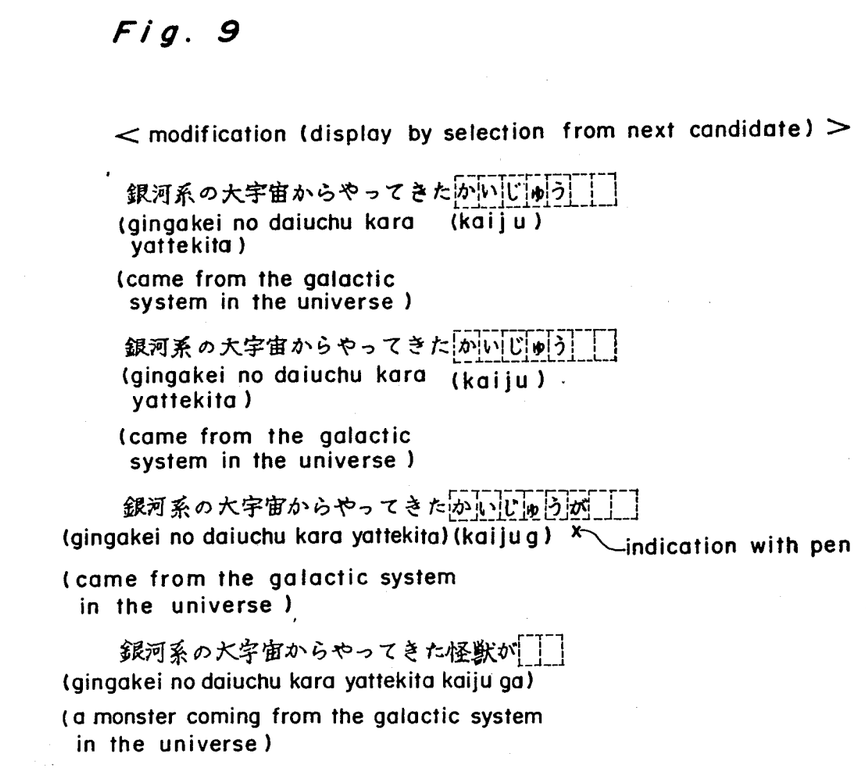
FIGS. 9 through 11 are explanatory views for describing the operation of the the handwritten character-recognizing apparatus embodying the second embodiment.

Referring to FIG. 9, if it is detected that at step S24 the point of the pen 2 is not located outside the character frames, it is determined at step S27 whether or not the point of the pen 2 is located in any of the character frames (first character frame through the (i)-th character frame) in which recognized characters have been displayed. If the point of the pen 2 is located in any of the character frames, a next candidate character in the (j)-th character frame (j=1~i) is read from the candidate characters stored in the CPU 15 as a result of the character recognition for replacing the character currently displayed in the (j)-th character with the candidate character thus read out at step S28.

If it is detected that no characters have been written in any of the (n) pieces of character frames, the coordinate of the point of the pen 2 is read at step S13. At step S14, it is determined whether or not a character has been written with the pen 2 in any of the character frames. If the pen 2 has begun to write a character in the first character frame of the (n) pieces of the character frames, the numerical value of the counter is incremented by one. Thereafter, the program goes to step S17.

Referring to FIG. 10, if it is determined that the point of the pen 2 is not located in any of the (n) pieces of the character frames at step S14, the program goes to step S16 and the (n) pieces of character frames are moved to the coordinate indicated by the pen 2. Generally, a position indicated by the pen 2 is shown by a coordinate (x, y) corresponding to the pixel (dot) of the display portion 4, but a position of a sentence is shown by a coordinate corresponding to X-row, Y-column. As shown in FIG. 11, an editing window may be displayed on the display portion 4 so that the CPU 15 may perform an editing operation similar to the operation described at step S25.

As apparent from the foregoing description, according to the second embodiment of the present invention, when it is detected that the point of the pen is outside a character frame and that characters are displayed in the character frames, the characters are edited. When it is detected that the point of the pen is outside the character frames and that no character is displayed in the character frames, the character frames are moved to the coordinate indicated by the point of the pen. Accordingly, there is no need for providing a keyboard and only the operation of the pen enables the editing of the characters and the movement of the character frames.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handwritten character-recognizing apparatus comprising:
   writing/displaying means for writing and displaying character information thereon;
   input means for writing said character information in one of said plurality of character frames on said writing/displaying means;
   a central processing unit having discriminating means for discriminating whether said input means has moved from said one character frame to an adjacent character frame;
   character recognizing means having a plurality of standard characters stored therein for comparing said character information in said one character frame with said plurality of standard characters and displaying one of said standard characters on said writing/displaying means which corresponds with said character information in said one character frame in response to said input means being discriminated to have moved to said adjacent character frame by said discriminating means; and
   character frame generating means for automatically generating and displaying an additional character frame to said plurality of character frames in a position adjacent to the last character frame of said plurality of character frames in response to said discriminating means discriminating that said input means has moved from the one character frame to said adjacent character frame.

2. A handwritten character-recognizing apparatus for automatically generating additional character frames to a plurality of character frames comprising:
   a pen for inputting handwritten characters;
   writing/displaying means for displaying said plurality of character frames in which said handwritten characters are inputted with said pen and for sequentially displaying standard characters which correspond to said handwritten characters in said plurality of character frames;
   character recognizing means for comparing said handwritten characters with said standard characters stored therein and displaying said standard characters which correspond to said handwritten characters on said writing/displaying means;
   a central processing unit including,
      detecting means for detecting a position on said written/displaying means which is indicated by said pen,
      discriminating means for discriminating whether the position indicated with said pen and detected by said detecting means is located in one of said plurality of character frames,
      character editing means for editing said standard characters displayed in said plurality of character frames if the position indicated with said pen is discriminated to be outside said plurality of character frames by said discriminating means and said standard characters are displayed in said plurality of character frames, and
   character frame moving means for moving said plurality of character frames to the position indicated by said pen in response to the position indicated with said pen being discriminated to be outside said plurality of character frames by said discriminatory means and said standard characters fail to be displayed in said plurality of character frames; and
   character frame generating means for automatically generating and displaying said additional character frames to said plurality of character frames adjacent to the last character frame of said plurality of character frames in response to said discriminating means discriminating that said pen has moved from one of said character frames to an adjacent character frame.

3. A handwritten character-recognizing apparatus according to claim 1, wherein said input means comprises a pen for writing said character information on said writing/displaying means, an A/D converter for developing a digital signal in response to an analog signal received from said writing/displaying means corresponding to said character information, sampling means for developing sampled data at a constant interval of said digital signal from said A/D converter, and a character pattern buffer for storing said sampled data.

4. A handwritten character-recognizing apparatus according to claim 1, wherein said writing/displaying means comprises a tablet for writing said character information thereon and an electroluminescence display for displaying said character information.

5. A handwritten character-recognizing apparatus according to claim 1, wherein said writing/displaying means comprises a tablet for writing said character information thereon and a liquid crystal display for displaying said character information.

6. A handwritten character-recognizing apparatus according to claim 1, wherein said writing/displaying means comprises a tablet for writing said character information thereon and a CRT display for displaying said character information.

7. A handwritten character-recognizing apparatus according to claim 2, further comprising an A/D converter for developing a digital signal in response to an analog signal received from said writing/displaying means corresponding to said handwritten characters, sampling means for developing sampled data at a constant interval of said digital signal from said A/D converter, and a character pattern buffer for storing said sampled data.

8. A handwritten character-recognizing apparatus according to claim 2, wherein said writing/displaying means comprises a tablet for writing said character information thereon and an electroluminescence display for displaying said character information.

9. A handwritten character-recognizing apparatus according to claim 2, wherein said writing/displaying means comprises a tablet for writing said character information thereon and a liquid crystal display for displaying said character information.

10. A handwritten character-recognizing apparatus according to claim 2, wherein said writing/displaying means comprises a tablet for writing said character information thereon and a CRT display for displaying said character information.

11. A method for automatically generating additional character frames to a plurality of character frames comprising the steps of:
  writing character information in one of said plurality of character frames on writing/displaying means;
  discriminating whether said character information is being written in an adjacent character frame to said one character frame;
  comparing said character information in said one character frame with a plurality of standard characters when said character information is discriminated to being written in said adjacent character frame;
  displaying one of said plurality of standard characters on said writing/displaying means which corresponds with said character information in said one character frame when said character information is discriminated to being written in said adjacent character frame; and
  automatically generating and displaying said additional character frames to said plurality of character frames adjacent to the last character of said plurality of character frames when said character information is discriminated to being written in said adjacent character frame.

* * * * *